US011200688B2

(12) United States Patent
Iwahashi et al.

(10) Patent No.: US 11,200,688 B2
(45) Date of Patent: Dec. 14, 2021

(54) IMAGING APPARATUS AND SOLID-STATE IMAGING DEVICE USED THEREIN

(71) Applicant: PANASONIC INTELLECTUAL PROPERTY MANAGEMENT CO., LTD., Osaka (JP)

(72) Inventors: Kenji Iwahashi, Kanagawa (JP); Hiroki Shinde, Kyoto (JP); Tomohiro Honda, Shiga (JP); Noritaka Shimizu, Osaka (JP); Hiroshi Iwai, Osaka (JP); Osamu Shibata, Hyogo (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 16/429,965

(22) Filed: Jun. 3, 2019

(65) Prior Publication Data
US 2019/0287256 A1    Sep. 19, 2019

Related U.S. Application Data

(63) Continuation of application No. PCT/JP2017/042990, filed on Nov. 30, 2017.
(Continued)

(51) Int. Cl.
*G06T 7/521* (2017.01)
*G01C 9/06* (2006.01)
(Continued)

(52) U.S. Cl.
CPC ............... *G06T 7/521* (2017.01); *G01C 3/06* (2013.01); *G01C 9/06* (2013.01); *G01S 17/10* (2013.01);
(Continued)

(58) Field of Classification Search
CPC ........... G06T 7/521; G06T 2207/30256; G06T 2207/10048; G01S 17/87; G01S 17/93;
(Continued)

(56) References Cited

U.S. PATENT DOCUMENTS 6,067,110 A * 5/2000 Nonaka .................. B60Q 9/006
348/148
6,590,521 B1 * 7/2003 Saka ...................... G01S 13/867
342/70
(Continued)

FOREIGN PATENT DOCUMENTS

JP    2011-064498 A    3/2011
JP    2015-206888 A    11/2015
(Continued)

OTHER PUBLICATIONS

International Search Report and Written Opinion dated Feb. 13, 2018 in International Application No. PCT/JP2017/042990; with partial English translation.
(Continued)

*Primary Examiner* — Tung T Vo
(74) *Attorney, Agent, or Firm* — McDermott Will and Emery LLP

(57) ABSTRACT

An imaging apparatus that is mounted on a vehicle that runs on a road surface includes: a light source that emits illumination light which is infrared light; a solid-state imaging device that images a subject and outputs an imaging signal indicating a light exposure amount; and a computator that computes subject information regarding the subject by using the imaging signal. The solid-state imaging device includes: first pixels that image the subject by receiving reflected light that is the illumination light reflected off the subject; and second pixels that image the subject by receiving visible light. Information indicated by an imaging signal outputted from the first pixels is information regarding a slope of the (Continued)

road surface, and information indicated by an imaging signal outputted from the second pixels is information regarding an appearance of the road surface.

12 Claims, 10 Drawing Sheets

Related U.S. Application Data

(60) Provisional application No. 62/430,035, filed on Dec. 5, 2016.

(51) Int. Cl.
    *G01S 17/10*     (2020.01)
    *G01S 17/93*     (2020.01)
    *H04N 5/225*     (2006.01)
    *G01C 3/06*     (2006.01)
    *G01S 17/87*     (2020.01)
    *G01S 17/894*     (2020.01)

(52) U.S. Cl.
    CPC ............ *G01S 17/87* (2013.01); *G01S 17/894* (2020.01); *G01S 17/93* (2013.01); *H04N 5/2256* (2013.01); *G01C 2009/066* (2013.01); *G06T 2207/10048* (2013.01); *G06T 2207/30256* (2013.01)

(58) Field of Classification Search
    CPC ........ G01S 17/10; G01S 17/894; G01S 17/86; G01S 17/931; G01C 3/06; G01C 9/06; G01C 2009/066; H04N 5/2256
    USPC .......................................................... 348/113
    See application file for complete search history.

(56) References Cited

U.S. PATENT DOCUMENTS

| | | | | |
|---|---|---|---|---|
| 6,963,657 B1* | 11/2005 | Nishigaki | ........... | G06K 9/00201 382/106 |
| 8,825,260 B1* | 9/2014 | Silver | ................ | G01S 13/865 701/23 |
| 10,003,755 B2* | 6/2018 | Lu | ..................... | H04N 5/2258 |
| 10,397,497 B1* | 8/2019 | Graves | ................ | G01S 7/4808 |
| 2003/0227378 A1* | 12/2003 | Nakai | ................ | G06K 9/00805 340/435 |
| 2004/0091133 A1* | 5/2004 | Monji | ................ | H04N 5/332 382/104 |
| 2004/0118624 A1* | 6/2004 | Beuhler | ................ | G01S 17/58 180/167 |
| 2006/0102843 A1* | 5/2006 | Bazakos | ............ | G06K 9/00255 250/339.05 |
| 2007/0075892 A1* | 4/2007 | Horibe | ................ | G06T 7/73 342/70 |
| 2007/0222566 A1* | 9/2007 | Tsuji | ................ | G06K 9/00791 340/435 |
| 2007/0247611 A1* | 10/2007 | Tamaki | ................ | H04N 5/332 356/3.11 |
| 2008/0029701 A1* | 2/2008 | Onozawa | ............... | G01S 7/493 250/332 |
| 2011/0169984 A1* | 7/2011 | Noguchi | ............... | H04N 5/332 348/234 |
| 2012/0062372 A1* | 3/2012 | Augst | ............... | G06K 9/00798 340/435 |
| 2012/0062746 A1* | 3/2012 | Otsuka | ................ | H04N 7/18 348/148 |
| 2012/0092173 A1* | 4/2012 | Sanchez | ............... | B60W 50/14 340/576 |
| 2012/0154785 A1* | 6/2012 | Gilliland | ............... | G01S 17/931 356/5.01 |
| 2012/0177252 A1 | 7/2012 | Korekado et al. | | |
| 2013/0229513 A1* | 9/2013 | Ichitani | .............. | G02B 27/1066 348/135 |
| 2013/0253754 A1* | 9/2013 | Ferguson | .............. | G05D 1/0231 701/28 |
| 2015/0256767 A1* | 9/2015 | Schlechter | ........... | H04N 13/207 348/46 |
| 2015/0367781 A1* | 12/2015 | Takemae | ............ | G06K 9/00798 348/148 |
| 2016/0096477 A1* | 4/2016 | Biemer | ................ | H04N 5/3696 348/148 |
| 2016/0210736 A1 | 7/2016 | Aruga | | |
| 2016/0259057 A1 | 9/2016 | Ito | | |
| 2016/0350601 A1* | 12/2016 | Grauer | ............... | G06K 9/00791 |
| 2017/0052257 A1 | 2/2017 | Ito et al. | | |
| 2017/0206415 A1* | 7/2017 | Redden | ................ | H04N 13/204 |
| 2017/0275023 A1* | 9/2017 | Harris | .................... | B64C 39/024 |
| 2017/0347086 A1* | 11/2017 | Watanabe | ............. | H04N 13/25 |
| 2018/0197022 A1* | 7/2018 | Fujikawa | ........... | G06K 9/00369 |
| 2018/0302575 A1* | 10/2018 | Lu | ......................... | H04N 5/2258 |
| 2018/0367746 A1* | 12/2018 | Toda | ........................ | H01L 27/14685 |
| 2019/0056498 A1* | 2/2019 | Sonn | ..................... | G01S 7/4865 |
| 2019/0124277 A1* | 4/2019 | Mabuchi | .............. | H04N 5/3696 |
| 2019/0280030 A1* | 9/2019 | Kuwahara | ............... | G01S 17/89 |

FOREIGN PATENT DOCUMENTS

| | | |
|---|---|---|
| JP | 2016-088183 A | 5/2016 |
| JP | 2016-133399 A | 7/2016 |
| WO | 2015/182135 A1 | 12/2015 |

OTHER PUBLICATIONS

Extended European Search Report dated Nov. 21, 2019 for the corresponding European Patent Application No. 17878837.8.

* cited by examiner

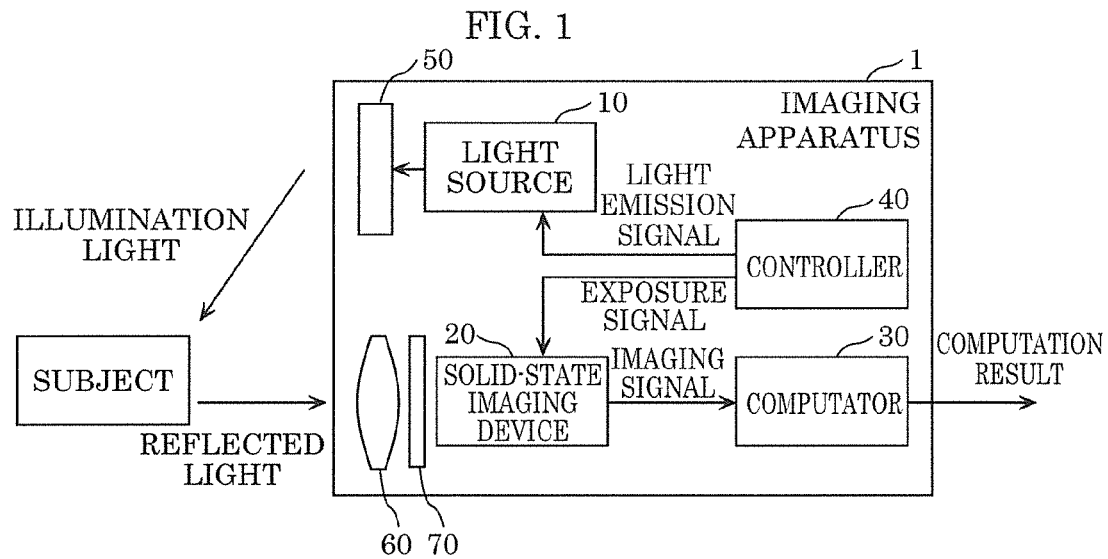
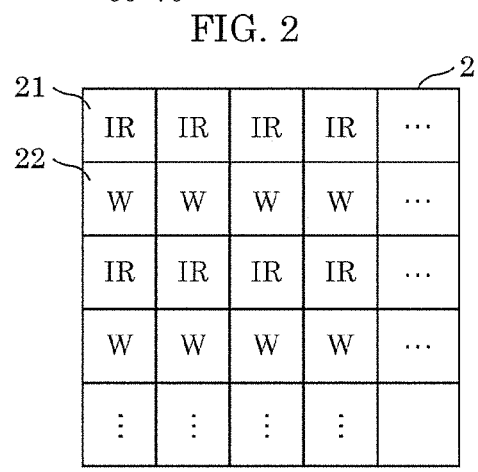
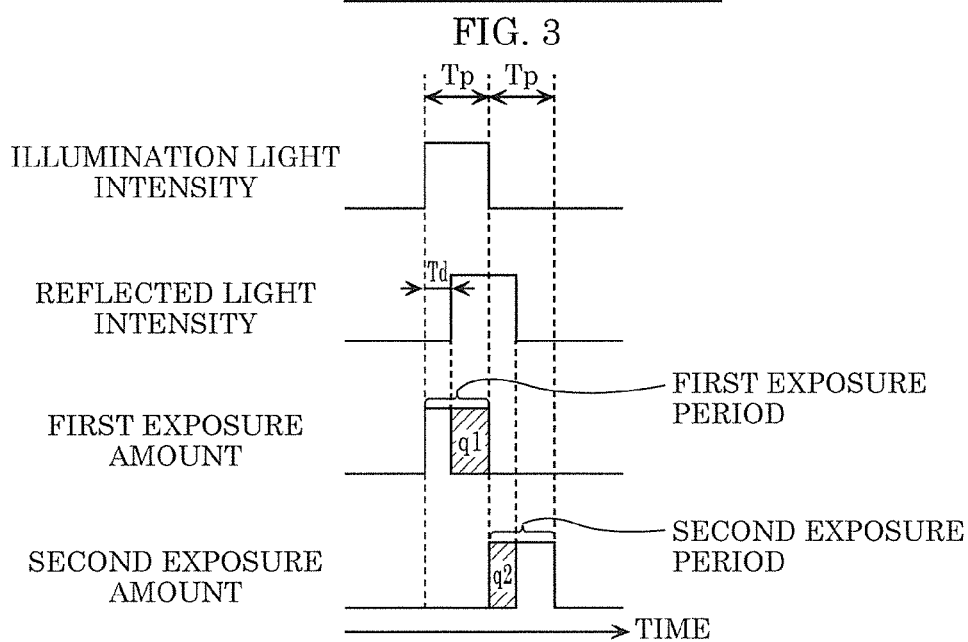

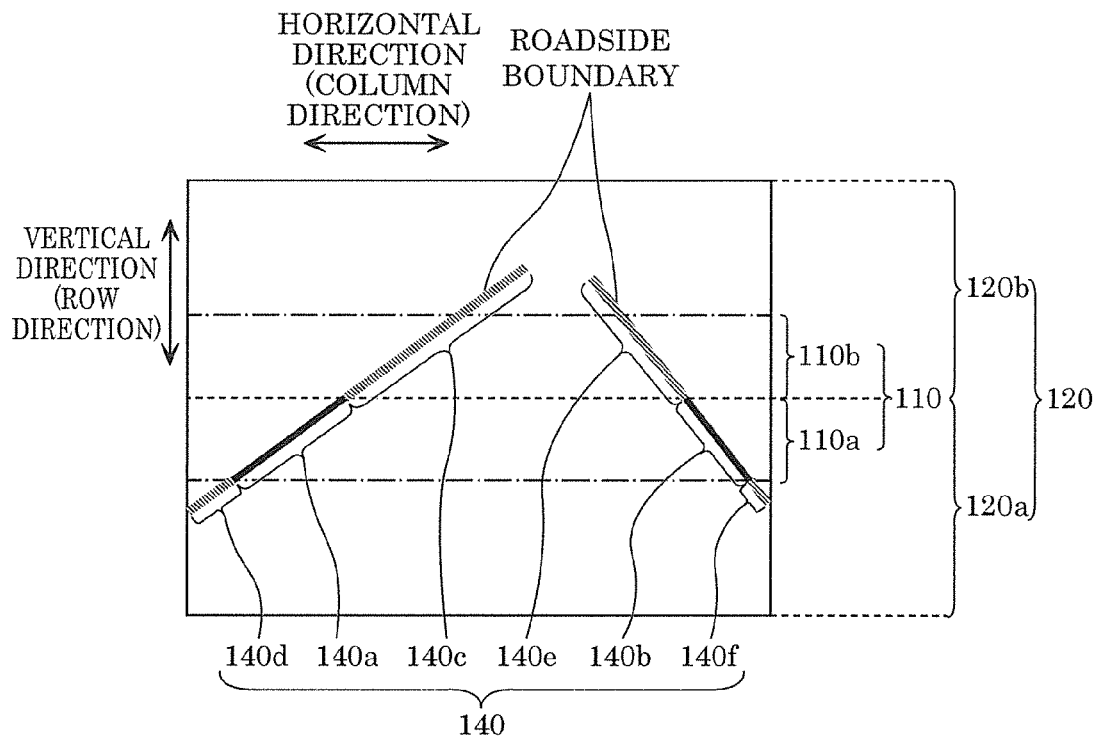

OUTPUT ORDER OF SIGNALS

OUTPUT ORDER OF SIGNALS

IMAGING APPARATUS AND SOLID-STATE IMAGING DEVICE USED THEREIN

CROSS REFERENCE TO RELATED APPLICATIONS

This application is a U.S. continuation application of PCT International Patent Application Number PCT/JP2017/042990 filed on Nov. 30, 2017, claiming the benefit of priority of U.S. Provisional Patent Application No. 62/430,035 filed on Dec. 5, 2016, the entire contents of which are hereby incorporated by reference.

BACKGROUND

1. Technical Field

The present disclosure relates to an imaging apparatus that images a subject.

2. Description of the Related Art

Conventionally, an image apparatus that images a subject is known (see, for example, Japanese Unexamined Patent Application Publication No. 2011-64498).

SUMMARY

In an imaging apparatus, improvement in the accuracy of measuring the distance to a subject and/or the accuracy of detecting the subject is desired.

Accordingly, it is an object of the present disclosure to provide an imaging apparatus in which the accuracy of measuring the distance to a subject and/or the accuracy of detecting the subject can be improved as compared with conventional imaging apparatuses, and a solid-state imaging device used therein.

An imaging apparatus that is mounted on a vehicle that runs on a road surface, the imaging apparatus including: a light source that emits illumination light which is infrared light; a solid-state imaging device that images a subject and outputs an imaging signal indicating a light exposure amount; and a computator that computes subject information regarding the subject by using the imaging signal, wherein the solid-state imaging device includes: first pixels that image the subject by receiving reflected light that is the illumination light reflected off the subject; and second pixels that image the subject by receiving visible light, information indicated by an imaging signal outputted from the first pixels is information regarding a slope of the road surface, and information indicated by an imaging signal outputted from the second pixels is information regarding an appearance of the road surface.

A solid-state imaging device used in an imaging apparatus that is mounted on a vehicle that runs on a road surface and includes a light source that emits illumination light which is infrared light, the solid-state imaging device, and a computator that computes subject information regarding a subject by using an imaging signal, the solid-state imaging device including: first pixels that image the subject by receiving reflected light that is the illumination light reflected off the subject; and second pixels that image the subject by receiving visible light, wherein information indicated by an imaging signal outputted from the first pixels is information regarding a slope of the road surface, and information indicated by an imaging signal outputted from the second pixels is information regarding an appearance of the road surface.

With the imaging apparatus and the solid-state imaging device configured as described above, the accuracy of measuring the distance to a subject and/or the accuracy of detecting the subject can be improved as compared with conventional imaging apparatuses.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram showing a configuration of an imaging apparatus according to an embodiment;

FIG. 2 is a schematic diagram showing a pixel array included in a solid-state imaging device according to an embodiment;

FIG. 3 is a timing diagram showing the relationship between light emission timing and exposure timing during distance measurement by using TOF distance measuring principle;

FIG. 10 is a schematic diagram showing a state in which the imaging apparatus according to an embodiment images a road surface;

FIG. 11 is a schematic diagram showing an example of the relationship between the output order of IR images and the output order of W images;

DETAILED DESCRIPTION OF THE EMBODIMENT

Figure 4:
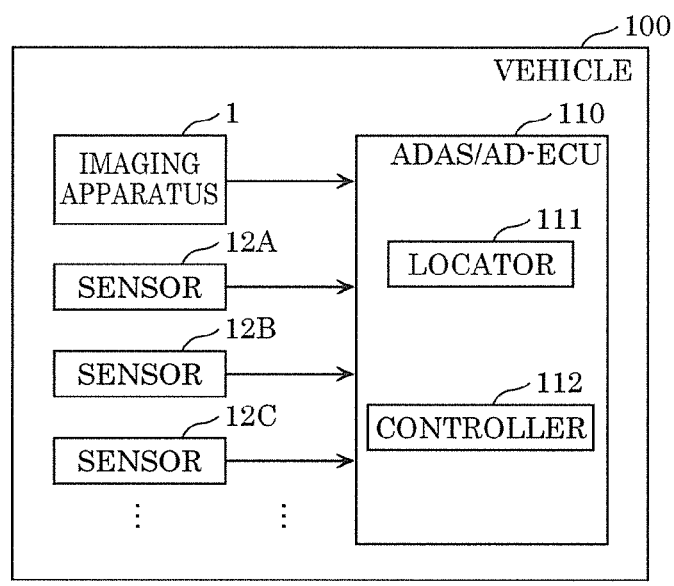
FIG. 4 is a block diagram showing an example in which the imaging apparatus according to an embodiment is mounted on and used in a vehicle.

An imaging apparatus according to one aspect of the present disclosure is an imaging apparatus that is mounted on a transporter, the imaging apparatus including: a light source that emits illumination light; a solid-state imaging device that images a subject and outputs an imaging signal indicating a light exposure amount; and a computator that computes subject information regarding the subject by using the imaging signal, wherein the solid-state imaging device includes: first pixels that perform imaging by using reflected light that is the illumination light reflected off the subject; and second pixels that image the subject, an imaging region to be imaged by the solid-state imaging device includes a first region that is imaged by at least the first pixels and a second region that is imaged by the second pixels, one of the first region and the second region is situated around the other of the first region and the second region, the computator computes the subject information based on information from the first region and information from the second region, and an illumination angle of the illumination light in a vertical direction of the transporter is smaller than a viewing angle of the imaging region in the vertical direction of the transporter.

Also, in the imaging apparatus, an illumination angle of the illumination light in a horizontal direction of the transporter may be different from a viewing angle of the imaging region in the horizontal direction of the transporter.

Also, in the imaging apparatus, the illumination angle of the illumination light in a horizontal direction of the transporter may be larger than the illumination angle of the illumination light in the vertical direction of the transporter.

Also, in the imaging apparatus, the subject may be an object on a road surface on which the transporter runs, the solid-state imaging device may successively perform imaging, and when the object is imaged in the first region at a first time, and then imaged in the second region at a second time that is time when a predetermined period of time has elapsed from the first time, information regarding a distance to the object at the first time may be used to compute the subject information at the second time.

Also, in the imaging apparatus, the subject may be an object on a road surface on which the transporter runs, the solid-state imaging device may successively perform imaging, and when the object is imaged in the second region at a first time, and then imaged in the first region at a second time that is time when a predetermined period of time has elapsed from the first time, information regarding an appearance of the object at the first time may be used to compute the subject information at the second time.

Also, in the imaging apparatus, the solid-state imaging device may successively perform imaging, and the computation performed by the computator may include associating information from one of the first region and the second region at a first time with information from the other of the first region and the second region at a second time that is different from the first time.

Also, in the imaging apparatus, the information from the first region may be information regarding a distance to the subject, the information from the second region may be information regarding an appearance of the subject, the computation performed by the computator may include estimating a distance to the subject in the second region, and the subject information may include information indicating the estimated distance to the subject in the second region.

Also, in the imaging apparatus, when the subject is an object that is continuously situated in the first region and the second region, a computation result of the first region may be associated with computation of the subject information in the second region.

Also, in the imaging apparatus, the first region may include a first a region where reflected light that is the illumination light reflected off a road surface on which the transporter runs reaches the solid-state imaging device and a first b region where the reflected light does not reach the solid-state imaging device.

Also, in the imaging apparatus, when the subject is an object that is continuously situated in the first region and the second region, a computation result of the first a region may be associated with computation of the subject information in a region other than the first a region.

Also, in the imaging apparatus, the transporter may be a vehicle that runs on a road surface, the information from the first region may be information regarding a slope of the road surface, the information from the second region may be information regarding an appearance of the road surface, the computation performed by the computator may include estimating a slope of the road surface in the second region, and the subject information may include information indicating the estimated slope of the road surface in the second region.

Also, in the imaging apparatus, the illumination light may be infrared light, the first pixels may receive infrared light, and the second pixels receive may visible light.

Also, the imaging apparatus may further include a diffuser plate that adjusts the illumination angle.

A solid-state imaging device according to one aspect of the present disclosure is a solid-state imaging device used in an imaging apparatus that is mounted on a transporter and includes a light source that emits illumination light and a computator that computes subject information regarding a subject by using an imaging signal indicating a light exposure amount, the solid-state imaging device being a device that images the subject and outputs the imaging signal, wherein the solid-state imaging device includes: first pixels that perform imaging by using reflected light that is the illumination light reflected off the subject; and second pixels that image the subject, an imaging region to be imaged by the solid-state imaging device includes a first region that is imaged by at least the first pixels and a second region that is imaged by the second pixels, one of the first region and the second region is situated around the other of the first region and the second region, the computator computes the subject information based on information from the first region and information from the second region, and an illumination angle of the illumination light in a vertical direction of the transporter is smaller than a viewing angle of the imaging region in the vertical direction of the transporter.

A specific example of an imaging apparatus according to one aspect of the present disclosure will be described with reference to the drawings. Note that the embodiment described below shows a specific example of the present disclosure. Accordingly, the numerical values, shapes, structural elements, the arrangement and connection of the structural elements, steps, the order of the steps, and the like shown in the following embodiment are merely examples, and therefore are not intended to limit the scope of the present disclosure. Among the structural elements described in the following embodiment, structural elements not recited in any one of the independent claims are described as arbitrary structural elements. In addition, the diagrams are schematic representations, and thus are not necessarily true to scale.

Embodiment

FIG. 1 is a block diagram showing a configuration of imaging apparatus 1 according to an embodiment.

As shown in FIG. 1, imaging apparatus 1 includes light source 10, solid-state imaging device 20, computator 30, controller 40, diffuser plate 50, lens 60, and band-pass filter 70.

Light source 10 emits illumination light. More specifically, light source 10 emits illumination light that illuminates a subject at a timing indicated by a light emission signal generated by controller 40.

Light source 10 includes, for example, a capacitor, a driving circuit, and a light emitting element, and emits light by driving the light emitting element by using electric energy stored in the capacitor. The light emitting element is implemented by, for example, a laser diode, a light emitting diode, or the like. Light source 10 may include one light emitting element, or may include a plurality of light emitting elements for different purposes.

The following description will be given assuming that the light emitting element is, for example, a laser diode that emits near infrared light, a light emitting diode that emits near infrared light, or the like, and the illumination light emitted by light source 10 is near infrared light. However, the illumination light emitted by light source 10 is not necessarily limited to near infrared light. The illumination light emitted by light source 10 may be, for example, infrared light at a frequency band outside the near infrared frequency band.

Solid-state imaging device 20 images a subject and outputs an imaging signal that indicates the amount of light exposure (light exposure amount). More specifically, solid-state imaging device 20 performs exposure at a timing indicated by an exposure signal generated by controller 40, and outputs the imaging signal that indicates the light exposure amount.

Solid-state imaging device 20 includes a pixel array in which first pixels that perform imaging by using reflected light that is the illumination light reflected off a subject and second pixels that image the subject are arranged in an array. Solid-state imaging device 20 may optionally include, for example, a cover glass, a logic function such as an AD converter, and the like.

As with the illumination light, the following description will be given assuming that the reflected light is near infrared light, but the reflected light is not necessarily limited to near infrared light as long as it is the illumination light reflected off a subject.

FIG. 2 is a schematic diagram showing pixel array 2 included in solid-state imaging device 20.

As shown in FIG. 2, pixel array 2 is configured such that first pixels 21 (IR pixels) that perform imaging by using reflected light that is the illumination light reflected off a subject and second pixels 22 (W pixels) that image the subject are arranged in an array so as to alternate in each column.

Also, in FIG. 2, in pixel array 2, second pixels 22 and first pixels 21 are arranged so as to be adjacent in the row direction, and second pixels 22 and first pixels 21 are placed in alternate rows to form a stripe pattern. However, the pixel arrangement is not limited thereto. Second pixels 22 and first pixels 21 may be arranged in every plurality of rows (for example, every other two rows). That is, first rows in each of which second pixels 22 are adjacent in the row direction and second rows in each of which first pixels 21 are adjacent in the row direction may be alternately arranged every M rows (where M is a natural number). Furthermore, the first rows in each of which second pixels 22 are adjacent in the row direction and the second rows in each of which first pixels 21 are adjacent in the row direction may be arranged differently (i.e., the first rows may be arranged every N rows and the second rows may be arranged in every L rows (where N and L are different natural numbers)).

First pixels 21 are implemented by, for example, near infrared light pixels that are sensitive to near infrared light that is the reflected light. Second pixels 22 are implemented by, for example, visible light pixels that are sensitive to visible light.

The near infrared light pixels are each composed of, for example, an optical filter that allows only near infrared light to pass therethrough, a microlens, a light receiving element that serves as a photoelectric converter, a storage that stores electric charges generated by the light receiving element, and the like. Likewise, the visible light pixels are each composed of, for example, an optical filter that allows only visible light to pass therethrough, a microlens, a light receiving element that serves as a photoelectric converter, a storage that stores electric charges converted by the light receiving element, and the like. The optical filter included in each visible light pixel may be configured to allow both visible light and near infrared light to pass therethrough, or may be configured to allow only light in a specific wavelength band of visible light such as red (R), green (G), or blue (B) to pass therethrough.

Again, referring back to FIG. 1, imaging apparatus 1 will be further described.

Computator 30 computes subject information regarding the subject by using the imaging signal output from solid-state imaging device 20.

Computator 30 is configured by using, for example, a computation processing device such as a microcomputer. The microcomputer includes a processor (microprocessor), a memory, and the like, and generates a light emission signal and an exposure signal as a result of a driving program stored in the memory being executed by the processor. As computator 30, an FPGA, an ISP, or the like may be used. Also, computator 30 may be configured by using one hardware component or a plurality of hardware components.

Computator 30 calculates the distance to the subject based on, for example, TOF distance measuring principle that is performed by using the imaging signals output from first pixels 21 of solid-state imaging device 20.

Hereinafter, the calculation of the distance to the subject by using the TOF distance measuring principle performed by computator 30 will be described with reference to the drawings.

FIG. 3 is a timing diagram showing the relationship between the light emission timing of the light emitting element of light source 10 and the exposure timing of exposure to first pixels 21 of solid-state imaging device 20 when computator 30 calculates the distance to the subject by using the TOF distance measuring principle.

In FIG. 3, Tp represents a light emission period during which the light emitting element of light source 10 emits illumination light. Td represents a delay time from when the light emitting element of light source 10 emits illumination light to when reflected light that is the illumination light reflected off the subject returns to solid-state imaging device

20. First exposure period is the same timing as the light emission period during which light source 10 emits illumination light, and second exposure period is the time from the end of the first exposure period to the end of elapse of a light emission period Tp.

In FIG. 3, q1 represents the total amount of exposure of reflected light to first pixels 21 of solid-state imaging device 20 during the first exposure period, and q2 represents the total amount of exposure of reflected light to first pixels 21 of solid-state imaging device 20 during the second exposure period.

As a result of the emission of illumination light by the light emitting element of light source 10 and the light exposure to first pixels 21 by solid-state imaging device 20 being performed at the timing shown in FIG. 3, distance d to the subject can be represented by Equation 1 given below, where c represents light velocity.

$$d = c \times Tp/2 \times q1/(q1+q2) \quad \text{Equation 1}$$

Accordingly, with Equation 1, computator 30 can calculate the distance to the subject by using the imaging signals output from first pixels 21 of solid-state imaging device 20.

Again, referring back to FIG. 1, imaging apparatus 1 will be further described.

Computator 30 performs detection of the subject and calculation of the distance to the subject by using, for example, imaging signals output from second pixels 22 of solid-state imaging device 20.

That is, computator 30 makes a comparison between a first visible light image imaged by a plurality of second pixels 22 of solid-state imaging device 20 at a first time and a second visible light image imaged by a plurality of second pixels 22 of solid-state imaging device 20 at a second time, and performs detection of the subject and calculation of the distance to the subject based on the difference between the first and second visible light images. Here, the detection of the subject may be performed by, for example, distinguishing the shape of the subject based on pattern recognition by edge detection of feature points of the subject. Also, the calculation of the distance to the subject may be performed using world coordinate conversion.

Other examples of computation performed by computator 30 will be described later.

Controller 40 generates a light emission signal that indicates the timing of light emission and an exposure signal that indicates the timing of exposure. Then, controller 40 outputs the generated light emission signal to light source 10, and the generated exposure signal to solid-state imaging device 20.

Controller 40 may cause imaging apparatus 1 to perform continuous imaging at a predetermined frame rate by, for example, generating and outputting the light emission signal so as to cause light source 10 to emit light on a predetermined cycle and generating and outputting the exposure signal so as to cause solid-state imaging device 20 to perform exposure on a predetermined cycle.

Controller 40 is configured by using, for example, a computation processing device such as a microcomputer. The microcomputer includes a processor (microprocessor), a memory, and the like, and generates a light emission signal and an exposure signal as a result of a driving program stored in the memory being executed by the processor. As controller 40, an FPGA, an ISP, or the like may be used. Also, controller 40 may be configured by using one hardware component or a plurality of hardware components.

Diffuser plate 50 adjusts the angle of illumination light.

Lens 60 is an optical lens that condenses external light entering imaging apparatus 1 on the surface of pixel array 2 of solid-state imaging device 20.

Band-pass filter 70 is an optical filter that allows near infrared light that is the reflected light and visible light to pass therethrough.

Imaging apparatus 1 configured as described above is mounted on and used in a transporter. The following description will be given assuming that imaging apparatus 1 is mounted on and used in a vehicle that runs on a road surface. However, the transporter on which imaging apparatus 1 is mounted is not necessarily limited to a vehicle. Imaging apparatus 1 may be mounted on and used in a transporter other than a vehicle such as, for example, a motorcycle, a boat, or an airplane.

Although the accuracy of the distance to the subject decreases as compared with that calculated by using the TOF distance measuring principle described above, computator 30 may calculate the distance to the subject without using the imaging signals from first pixels 21 of solid-state imaging device 20.

FIG. 4 is a block diagram showing an example in which imaging apparatus 1 is mounted on and used in vehicle 100.

As shown in FIG. 4, imaging apparatus 1 is used by being connected to, for example, ADAS (Advanced Driver Assistance System)/AD-ECU (Automated Driving-Engine Control Unit) 110 mounted on vehicle 100.

ADAS/AD-ECU 110 is a system that is mounted on vehicle 100 and performs automatic drive control on vehicle 100 by utilizing the signals from imaging apparatus 1 and sensors 12A to 12C, and includes locator 111 that locates the position of the vehicle, controller 112 that controls a brake, a steering wheel, an engine, and the like, and other components.

Imaging apparatus 1 may be mounted at any position on vehicle 100. For example, imaging apparatus 1 may be mounted at the center of the front surface of vehicle 100, or in other words, at the center between two headlights, and an area in the front direction of vehicle 100 can be defined as an imaging region to be imaged by imaging apparatus 1.

Figure 5A:
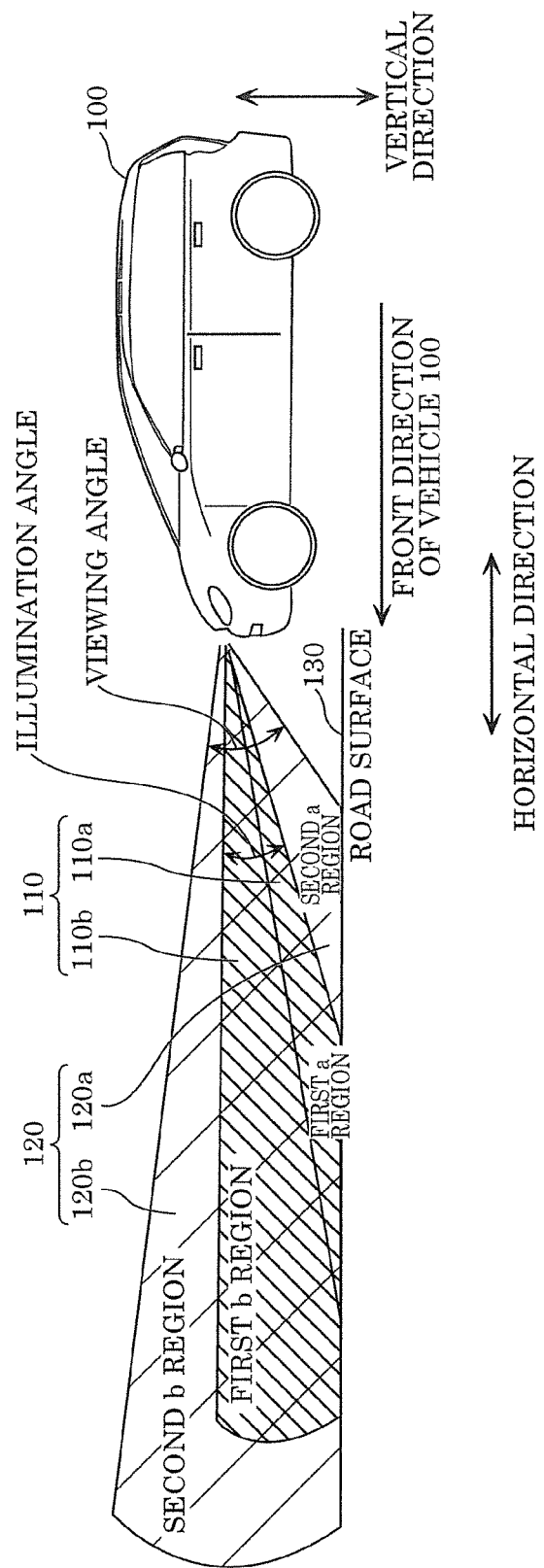
FIG. 5A is a side view schematically showing an example of an imaging region to be imaged by the imaging apparatus according to an embodiment.

FIG. 5A is a side view schematically showing an example of an imaging region to be imaged by imaging apparatus 1 in the case of an external environment where the imaging distance with visible light is longer than the imaging distance with reflected light such as the daytime of a sunny day when imaging apparatus 1 is mounted at the center of the front surface of vehicle 100 so as to monitor an area in the front direction of vehicle 100.

As shown in FIG. 5A, first region 110 is a region that is imaged by at least first pixels 21. That is, first region 110 is a region where the illumination light emitted from light source 10 is reflected off a subject, and the reflected light can reach solid-state imaging device 20.

In FIG. 5A, second region 120 is a region that is imaged by second pixels 22. That is, second region 120 is a region where ambient light that is visible light can reach solid-state imaging device 20.

In the example shown in FIG. 5A, the illumination angle of illumination light in the vertical direction of vehicle 100 is appropriately adjusted by diffuser plate 50 so as to be smaller than the viewing angle of the imaging region in the vertical direction of vehicle 100. For example, the illumination angle of illumination light in the vertical direction of vehicle 100 may be set to about 20 degrees, and the viewing angle of the imaging region in the vertical direction of vehicle 100 may be set to about 30 degrees.

As described above, by adjusting the illumination range of illumination light to be smaller than the viewing angle of the imaging region, the illumination light emitted by light source 10 that is finite energy can be concentratedly directed to a particular target range. As a result, in the target range, the distance to which reflected light travels can be extended as compared with the case where the illumination light is not concentratedly directed.

As shown in FIG. 5A, in the case of an external environment where the imaging distance with visible light is longer than the imaging distance with reflected light, second region 120 is situated farther away from vehicle 100 than first region 110. That is, in the case of such an external environment, second region 120 is situated around first region 110 that is the other region.

Also, as shown in FIG. 5A, first region 110 includes first a region 110a and first b region 110b.

First a region 110a is a region of first region 110 where reflected light from road surface 130 (reference surface) and reflected light from the subject above the elevation angle of road surface 130 can reach solid-state imaging device 20.

First b region 110b is a region of first region 110 where reflected light from the subject above the elevation angle of road surface 130 can reach solid-state imaging device 20, but reflected light from the road surface does not reach solid-state imaging device 20.

Also, as shown in FIG. 5A, second region 120 includes second a region 120a and second b region 120b.

Second a region 120a is a region of second region 120 that is situated above the elevation angle of the interface between first a region 110a and first b region 110b.

Second b region 120b is a region of second region 120 that is situated below the elevation angle of the interface between first a region 110a and first b region 110b.

Figure 5B:
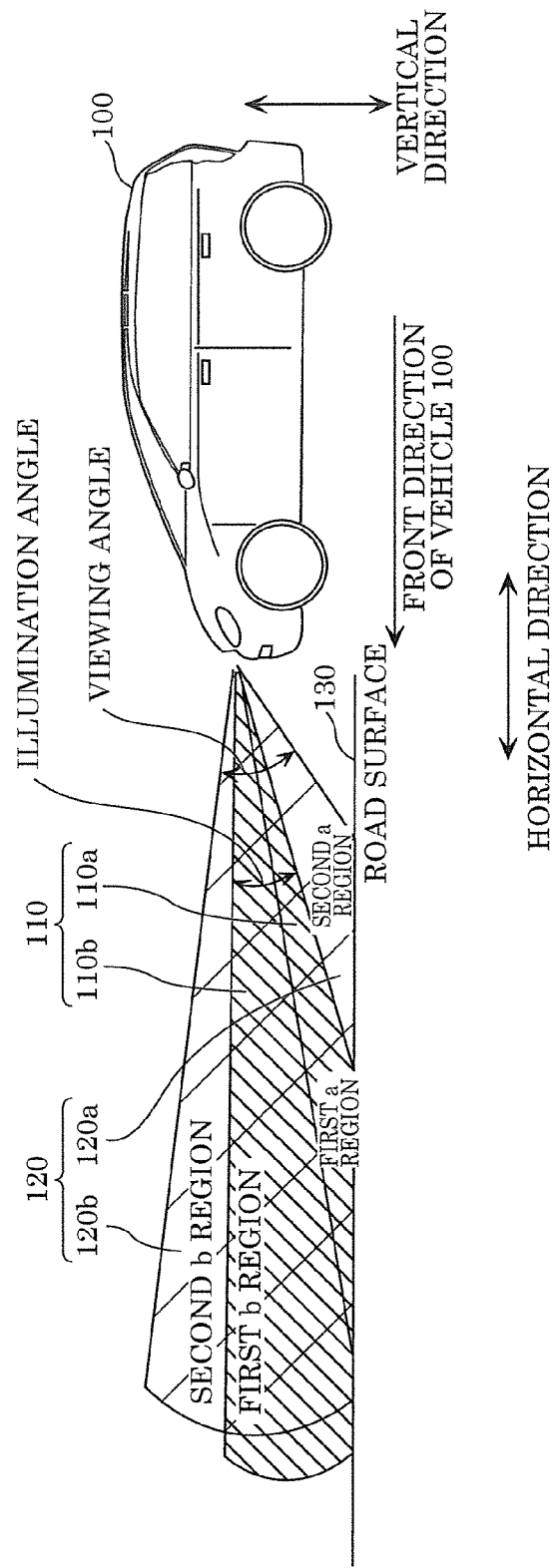
FIG. 5B is a side view schematically showing an example of an imaging region to be imaged by the imaging apparatus according to an embodiment.

FIG. 5B is a side view schematically showing an example of an imaging region to be imaged by imaging apparatus 1 in the case of an external environment where the imaging distance with reflected light is longer than the imaging distance with visible light (for example, in the case where the external environment is nighttime, a rainy day, a dense fog, or the like) when imaging apparatus 1 is mounted at the center of the front surface of vehicle 100 so as to monitor an area in the front direction of vehicle 100.

As shown in FIG. 5B, in the case of an external environment where the imaging distance with reflected light is longer than the imaging distance with visible light, first region 110 is situated farther away from vehicle 100 than second region 120. That is, in the case of such an external environment, first region 110 is situated around second region 120 that is the other region.

As described with reference to FIGS. 5A and 5B, the range of second region 120 may vary due to an external factor (for example, external environment). Also, likewise, the range of first region 110 may vary due to an external factor (for example, external environment).

The application of imaging apparatus 1 is not necessarily limited to monitoring the area in the front direction of vehicle 100 as shown in FIGS. 5A and 5B. For example, imaging apparatus 1 may be used to monitor an area in the rear direction of vehicle 100. That is, imaging apparatus 1 may be mounted, for example, at the center of the rear surface of the vehicle, or in other words, at the center between two taillights, and an area in the rear direction of vehicle 100 can be defined as an imaging region to be imaged by imaging apparatus 1.

Figure 6:
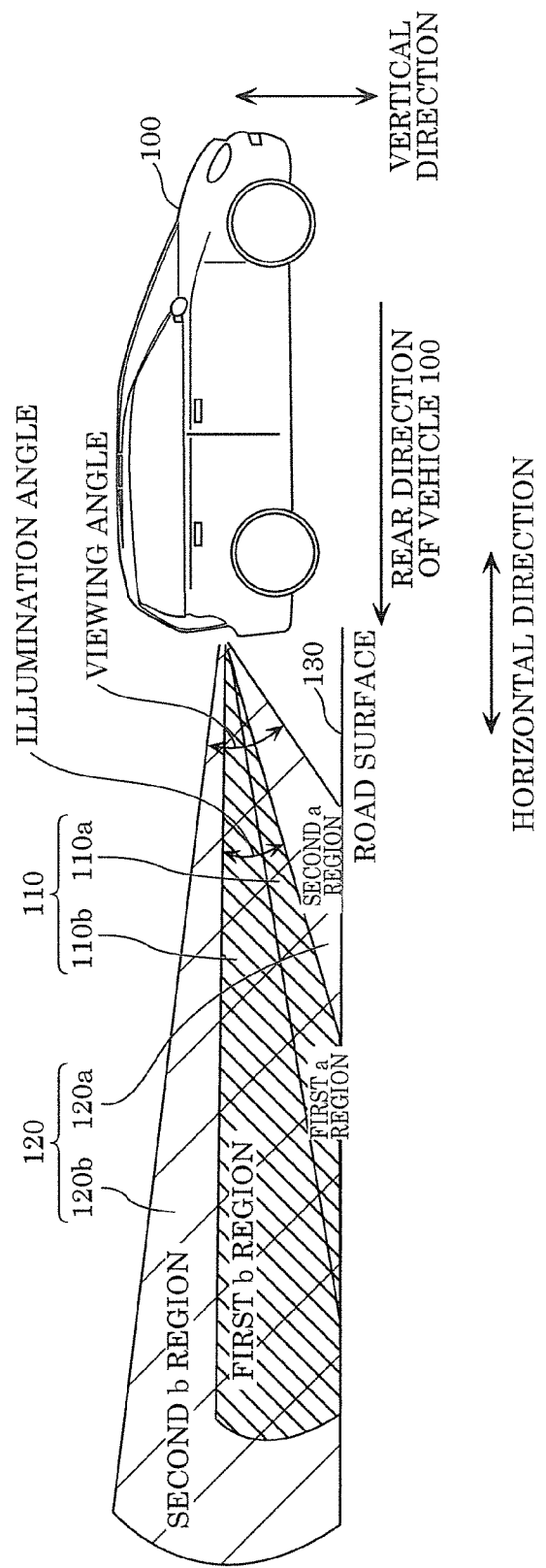
FIG. 6 is a side view schematically showing an example of an imaging region to be imaged by the imaging apparatus according to an embodiment.

FIG. 6 is a side view schematically showing an example of an imaging region to be imaged by imaging apparatus 1 in the case of an external environment where the imaging distance with visible light is longer than the imaging distance with reflected light such as the daytime of a sunny day when imaging apparatus 1 is mounted at the center of the rear surface of vehicle 100 so as to monitor an area in the rear direction of vehicle 100.

Figure 7A:
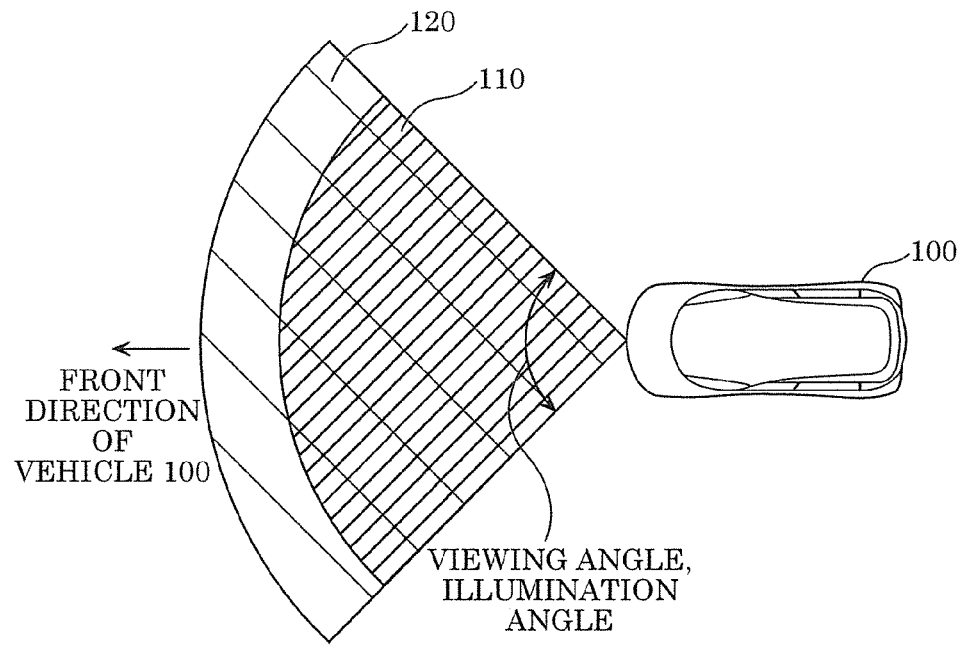
FIG. 7A is a plan view schematically showing an example of an imaging region to be imaged by the imaging apparatus according to an embodiment.

FIG. 7A is a plan view schematically showing an example of an imaging region to be imaged by imaging apparatus 1 in the case of an external environment where the imaging distance with visible light is longer than the imaging distance with reflected light (for example, in the case where the external environment is the daytime of a sunny day, or the like) when imaging apparatus 1 is mounted at the center of the front surface of vehicle 100 so as to monitor an area in the front direction of vehicle 100.

In the example shown in FIG. 7A, the angle of first region 110 in the horizontal direction of the vehicle is substantially equal to the angle of second region 120 in the horizontal direction of the vehicle. That is, the illumination angle of illumination light in the horizontal direction of vehicle 100 is appropriately adjusted by diffuser plate 50 so as to be substantially equal to the viewing angle of the imaging region in the horizontal direction of vehicle 100. For example, the illumination angle of illumination light in the horizontal direction of vehicle 100 may be set to about 90 degrees, and the viewing angle of the imaging region in the horizontal direction of vehicle 100 may be set to about 90 degrees.

As described above, by adjusting the illumination angle of illumination light in the horizontal direction of vehicle 100 so as to be substantially equal to the viewing angle of the imaging region in the horizontal direction of vehicle 100, a subject in the full viewing angle in the horizontal direction of the vehicle can be imaged by first pixels 21.

The illumination angle of illumination light in the horizontal direction of vehicle 100 may be different from the viewing angle of the imaging region in the horizontal direction of vehicle 100. For example, the illumination angle of illumination light in the horizontal direction of vehicle 100 may be set larger than the viewing angle of the imaging region in the horizontal direction of vehicle 100 such that the subject in the full viewing angle in the horizontal direction of the vehicle can be imaged more reliably by first pixels 21. For example, in the case where the viewing angle of the imaging region in the horizontal direction of vehicle 100 is set to about 90 degrees, the illumination angle of illumination light in the horizontal direction of vehicle 100 may be set to about 92 degrees.

Furthermore, imaging apparatus 1 may be used to monitor an area in a direction oblique to vehicle 100, or may be used to monitor a side area of vehicle 100.

FIG. 7A may be used as one of a plurality of sensing apparatuses for performing emergency brake control on vehicle 100.

Furthermore, FIG. 7A may be used as a sensing apparatus that measures a longer distance as compared with FIGS. 7B and 7C, which will be described later.

Figure 7B:
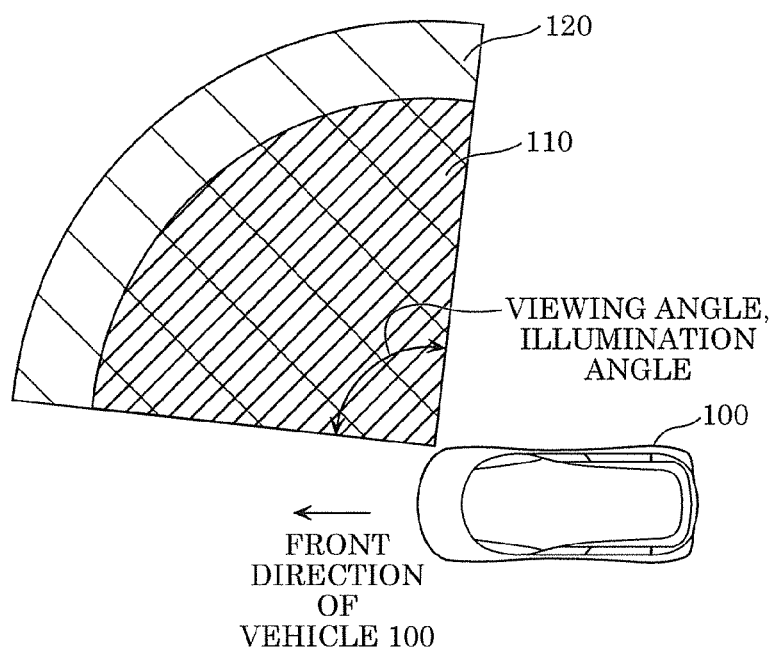
FIG. 7B is a plan view schematically showing an example of an imaging region to be imaged by the imaging apparatus according to an embodiment.

FIG. 7B is a plan view schematically showing an example of an imaging region to be imaged by imaging apparatus 1 in the case of an external environment where the imaging distance with visible light is longer than the imaging distance with reflected light (for example, in the case where the external environment is the daytime of a sunny day or the like) when imaging apparatus 1 is mounted near a headlight of vehicle 100 so as to monitor an area in a direction oblique to vehicle 100.

Figure 7C:
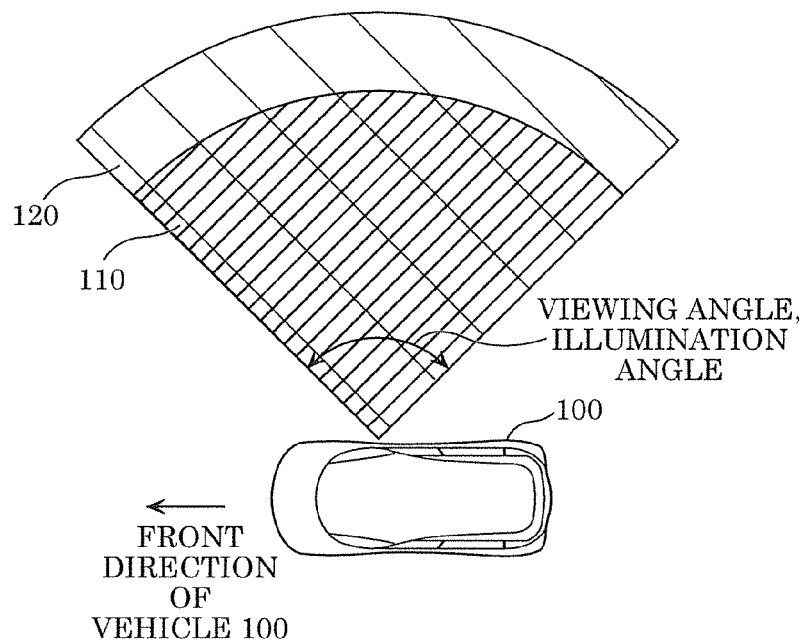
FIG. 7C is a plan view schematically showing an example of an imaging region to be imaged by the imaging apparatus according to an embodiment.

FIG. 7C is a plan view schematically showing an example of an imaging region to be imaged by imaging apparatus 1 in the case of an external environment where the imaging distance with visible light is longer than the imaging distance with reflected light (for example, in the case where the external environment is the daytime of a sunny day) when imaging apparatus 1 is mounted on the side surface of a side mirror of vehicle 100 so as to monitor a side area of vehicle 100.

FIGS. 7B and 7C may be used as one of a plurality of sensing apparatuses for performing automatic drive control on vehicle 100.

Furthermore, FIGS. 7B and 7C may be used as a sensing apparatus that measures a distance that is shorter than the distance measured by FIG. 7A, or an intermediate distance.

Particularly when imaging apparatus 1 is used to monitor an area in a direction oblique to vehicle 100 or a side area of vehicle 100, the illumination angle of illumination light in the horizontal direction of vehicle 100 may be substantially equal to the viewing angle of the imaging region in the horizontal direction of vehicle 100.

Figure 8:
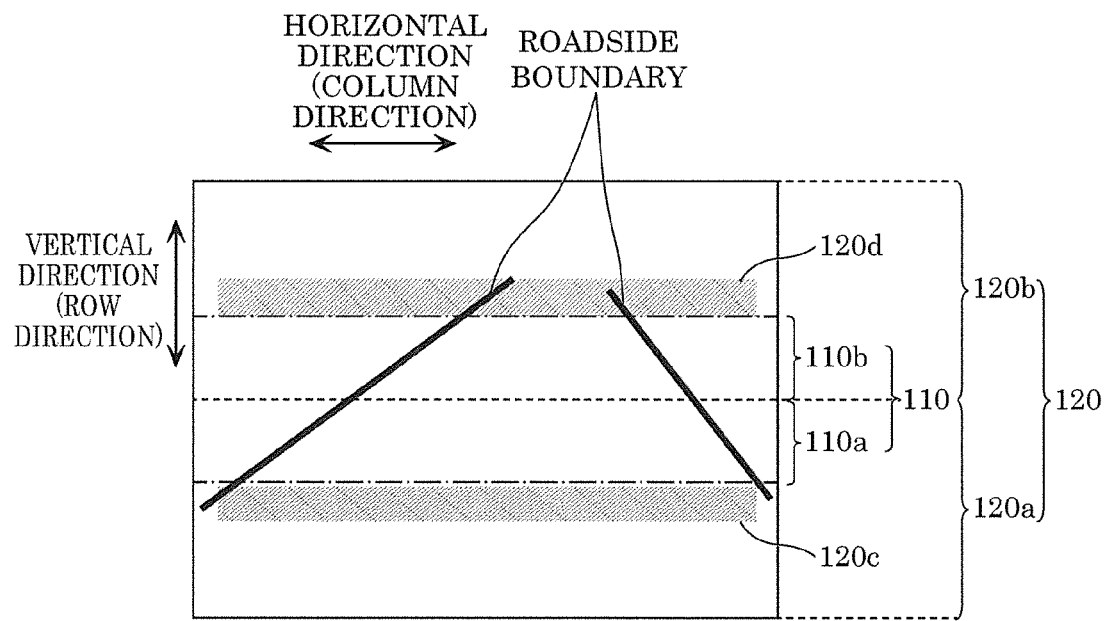
FIG. 8 is a schematic diagram showing a state in which the imaging apparatus according to an embodiment images a road surface.

FIG. 8 is a schematic diagram showing an example of a state in which imaging apparatus 1 images road surface 130 when first region 110 and second region 120 are in the relationship shown in FIGS. 5A and 7A, the diagram being viewed from imaging apparatus 1.

As shown in FIG. 8, in the vertical direction of vehicle 100, second region 120 is situated so as to extend over an area from the upper end to the lower end of the viewing angle of the captured image, but first region 110 is situated so as to extend over a limited area from below the upper end to above the lower end of the viewing angle of the captured image.

On the other hand, as shown in FIG. 8, in the horizontal direction of vehicle 100, first region 110 and second region 120 are both situated so as to extend over an area from the left end to the right end of the captured image.

In FIG. 8, second c region 120c is a region that is within second a region 120a but outside first a region 110a, and where reflected light may reach solid-state imaging device 20, but reflected light does not reach solid-state imaging device 20 in a stable manner. For this reason, computator 30 performs computation without using the imaging signals from first pixels 21 corresponding to second c region 120c.

Also, in FIG. 8, second d region 120d is a region that is within second b region 120b but outside first b region 110b, and where reflected light may reach solid-state imaging device 20, but reflected light does not reach solid-state imaging device 20 in a stable manner. For this reason, as with second c region 120c, computator 30 performs computation without using the imaging signals from first pixels 21 corresponding to second d region 120d.

Figure 9A:
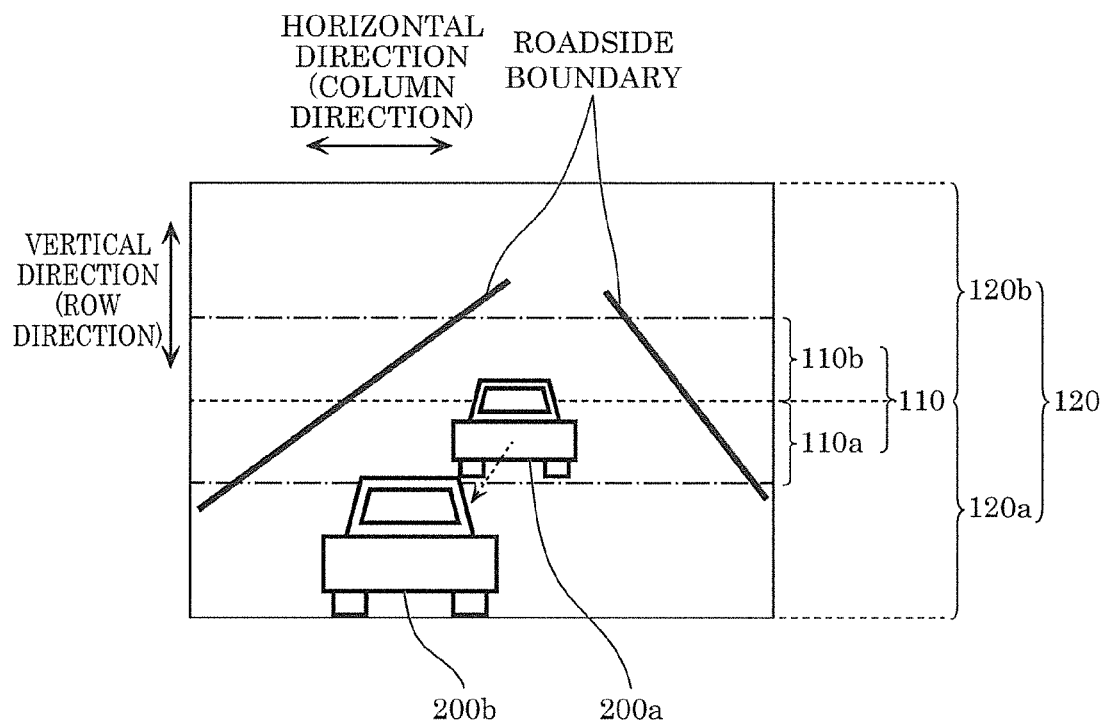
FIG. 9A is a schematic diagram showing a state in which the imaging apparatus according to an embodiment images a vehicle.
Figure 9B:
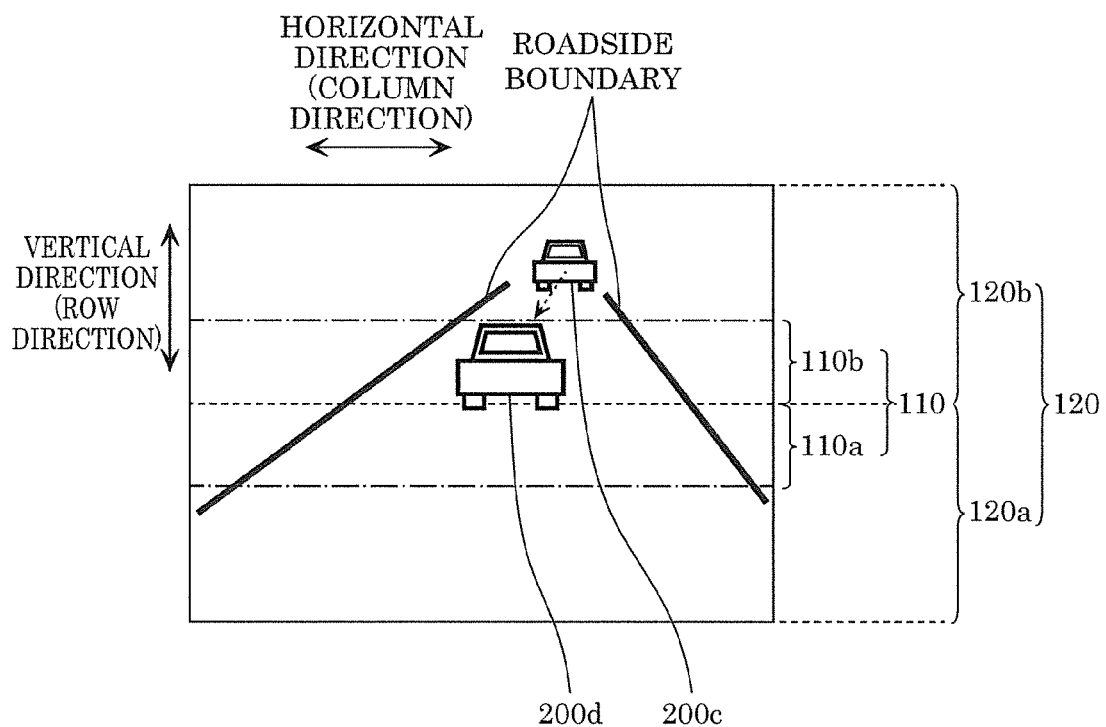
FIG. 9B is a schematic diagram showing a state in which the imaging apparatus according to an embodiment images a vehicle.

FIGS. 9A and 9B are schematic diagrams each showing an example of a state in which imaging apparatus 1 images vehicle 200 running on road surface 130 at a first time and a second time that is later than the first time when first region 110 and second region 120 are in the relationship shown in FIGS. 5A and 7A, the diagram being viewed from imaging apparatus 1.

In FIGS. 9A and 9B, vehicle 200a and vehicle 200c are vehicles 200 imaged at the first time, and vehicle 200b and vehicle 200d are vehicles 200 imaged at the second time that is later than the first time.

The examples shown in FIGS. 9A and 9B illustrate examples corresponding to scenes in which vehicle 100 approaches vehicle 200 during a period from the first time to the second time. However, the distance to vehicle 200 is different between the example shown in FIG. 9A and the example shown in FIG. 9B.

In the example shown in FIG. 9A, vehicle 200a is within first region 110, and is also within second region 120.

For this reason, computator 30 detects vehicle 200a, which is a subject to be imaged, based on the information from second region 120, or in other words, the imaging signals from second pixels 22 obtained at the first time, and also calculates the distance to vehicle 200a, which is the subject, with a relatively high degree of accuracy by using the TOF distance measuring principle based on the information from first region 110, or in other words, the imaging signals from first pixels 21 obtained at the first time.

On the other hand, in the example shown in FIG. 9A, vehicle 200b is outside first region 110, but is within second region 120.

For this reason, computator 30 detects vehicle 200b, which is a subject to be imaged, based on the information from second region 120, or in other words, the imaging signals from second pixels 22 obtained at the second time, but does not perform calculation of the distance to vehicle 200b, which is the subject, by using the TOF distance measuring principle based on the information from first region 110, or in other words, the imaging signals from first pixels 21. Instead, computator 30 calculates the distance to vehicle 200b, which is the subject, based on the information from second region 120, or in other words, the imaging signals from second pixels 22, without using the TOF distance measuring principle.

Then, computator 30 associates the information from first region 110 obtained at the first time and the information from second region 120 obtained at the second time with each other. More specifically, computator 30 compares the result of detection of vehicle 200a performed at the first time with the result of detection of vehicle 200b performed at the second time. If it is determined that vehicle 200a and vehicle 200b are the same vehicle 200, computator 30 associates (correlates) information indicating the distance to vehicle 200a calculated by using the TOF distance measuring principle at the first time and the result of detection of vehicle 200b performed at the second time with each other.

Then, computator 30 estimates the distance to the subject in the second region. More specifically, computator 30 estimates the distance to vehicle 200b at the second time based on information indicating the distance to vehicle 200a calculated by using the TOF distance measuring principle at the first time, the result of detection of vehicle 200b performed at the second time, and information indicating the distance to vehicle 200b calculated at the second time without using the TOF distance measuring principle.

By doing so, computator 30 can estimate the distance to vehicle 200b at the second time with a higher degree of accuracy as compared with the case where calculation is performed based on only the imaging signals from second pixels 22 obtained at the second time.

In the example shown in FIG. 9B, vehicle 200c is outside first region 110, but is within second region 120.

For this reason, computator 30 performs detection of vehicle 200c, which is a subject to be imaged, and calculation of the distance to vehicle 200c, which is the subject, without using the TOF distance measuring principle, based on the information from second region 120, or in other words, the imaging signals from second pixels 22 obtained at the first time.

That is, in the example shown in FIG. 9A, the subject is an object (vehicle 200a or vehicle 200b) on the road surface on which the transporter runs. Solid-state imaging device 20 successively performs imaging. When the object is imaged in first region 110 at a first time, and then imaged in second region 120 at a second time that is time when a predetermined period of time has elapsed from the first time, information regarding the distance to the object (vehicle 200a) at the first time is used to compute information regarding the subject (vehicle 200b) at the second time.

On the other hand, in the example shown in FIG. 9B, vehicle 200d is within first region 110, and is also within second region 120.

For this reason, computator 30 detects vehicle 200d, which is a subject to be imaged, based on the information from second region 120, or in other words, the imaging signals from second pixels 22 obtained at the second time, and also calculates the distance to vehicle 200d, which is the subject, with a relatively high degree of accuracy by using the TOF distance measuring principle based on the information from first region 110, or in other words, the imaging signals from first pixels 21 obtained at the second time. In this regard, computator 30 also performs the detection and the calculation based on the result of detection of vehicle 200c at the first time.

That is, computator 30 performs the detection and the calculation based on, for example, the result of detection of vehicle 200c at the first time by limiting the search range to a partial region.

By doing so, computator 30 can perform the detection and the calculation in a shorter time than that when the detection and the calculation are performed without using the result of detection of vehicle 200c.

Also, computator 30 detects vehicle 200d at the second time based on, for example, the result of detection of vehicle 200c at the first time and the imaging signals from second pixels 22 at the second time.

By doing so, computator 30 can detect vehicle 200d at the second time with a higher degree of accuracy than that when the detection is performed without using the result of detection of vehicle 200c at the first time.

That is, in the example shown in FIG. 9B, the subject is an object (vehicle 200c or vehicle 200d) on the road surface on which the transporter runs. Solid-state imaging device 20 successively performs imaging. When the object is imaged in second region 120 at a first time, and then imaged in first region 110 at a second time that is time when a predetermined period of time has elapsed from the first time, information regarding the appearance of the object (vehicle 200c) at the first time is used to compute information regarding the subject (vehicle 200d) at the second time.

As described above with reference to FIGS. 9A and 9B, when the position of the subject (vehicles 200a to 200d) changes (1) from first region 110 to second region 120, or (2) from second region 120 to first region 110 along with the elapse of time from the first time to the second time, the information from one of first region 110 and second region 120 at the first time is associated with the information from the other of first region 110 and second region 120 at the second time that is different from the first time, as a result of which it is possible to perform sensing (distance measurement, detection, and the like) of the subject at the second time in a short time and/or with a high degree of accuracy.

FIG. 10 is a schematic diagram showing an example of a state in which imaging apparatus 1 images road surface 130 when first region 110 and second region 120 are in the relationship shown in FIGS. 5A and 7A, the diagram being viewed from imaging apparatus 1. That is, the example shown in FIG. 10 corresponds to the same scene as that of the example shown in FIG. 8. However, for the sake of better understanding of the operations of computator 30, the illustration of FIG. 10 is partially shown in a different manner from that of FIG. 8.

In the example shown in FIG. 10, roadside boundary 140 that indicates the road sides of road surface 130 includes roadside boundary region 140a and roadside boundary region 140b that are included in first a region 110a, and roadside boundary regions 140c, 140d, 140e, and 140f that are not included in first a region 110a.

As described above, roadside boundary region 140a and roadside boundary region 140b are included in first a region 110a. For this reason, computator 30 detects road surface 130 (or in other words, roadside region) in roadside boundary region 140a and roadside boundary region 140b based on the information from second region 120, or in other words, the imaging signals from second pixels 22, and also calculates the distance to road surface 130 (or in other words, roadside region) in roadside boundary region 140a and roadside boundary region 140b with a relatively high degree of accuracy by using the TOF distance measuring principle based on the information from first a region 110a, or in other words, the imaging signals from first pixels 21.

By doing so, computator 30 can calculate the appearance and the slope of road surface 130 (or in other words, roadside region) in roadside boundary region 140a and roadside boundary region 140b.

On the other hand, as described above, roadside boundary regions 140c, 140d, 140e, and 140f are not included in first a region 110a. For this reason, computator 30 performs detection of road surface 130 (or in other words, roadside region) in roadside boundary regions 140c, 140d, 140e, and 140f based on the information from second region 120, or in other words, the imaging signals from second pixels 22, but does not perform calculation of the distances to road surface 130 (or in other words, roadside region) in roadside boundary regions 140c, 140d, 140e, and 140f by using the TOF distance measuring principle based on the information from first a region 110a, or in other words, the imaging signals from first pixels 21. Instead, computator 30 calculates the distances to road surface 130 (or in other words, roadside region) in roadside boundary regions 140c, 140d, 140e, and 140f based on the information from second region 120, or in other words, the imaging signals from second pixels 22 without using the TOF distance measuring principle.

Then, computator 30 calculates the appearance of road surface 130 (or in other words, roadside region) in roadside boundary regions 140c, 140d, 140e, and 140f, and also associates the information from first a region 110a with the information from second region 120. More specifically, computator 30 makes a comparison between the results of detection of road surface 130 (or in other words, roadside region) in roadside boundary regions 140a and 140b and the results of detection of road surface 130 (or in other words, roadside region) in roadside boundary regions 140c, 140d, 140e, and 140f. If it is determined that road surface 130 (or in other words, roadside region) in roadside boundary regions 140a and 140b and road surface 130 (or in other words, roadside region) in roadside boundary regions 140c, 140d, 140e, and 140f are portions of the same road surface 130 (or in other words, roadside region) at roadside boundary 140, computator 30 associates (correlates) information indicating the distances to road surface 130 (or in other words, roadside region) in roadside boundary regions 140a and 140b calculated by using the TOF distance measuring principle with the results of detection of road surface 130 (or in other words, roadside region) in roadside boundary regions 140c, 140d, 140e, and 140f.

Then, computator 30 estimates the slopes of road surface 130 (or in other words, roadside region) in roadside boundary regions 140c, 140d, 140e, and 140f. More specifically, computator 30 estimates the continuity of the roadside shape based on the appearance and the slopes of road surface 130 (or in other words, roadside region) in roadside boundary regions 140a and 140b, and the appearance of road surface 130 (or in other words, roadside region) in roadside boundary regions 140c, 140d, 140e, and 140f, and then estimates the slopes of road surface 130 (or in other words, roadside region) in roadside boundary regions 140c, 140d, 140e, and 140f based on the estimated continuity of the roadside shape.

By doing so, computator 30 can estimate the slope of road surface 130 in a region other than first a region 110a with a higher degree of accuracy than when calculation is performed based on only the imaging signals from second pixels 22.

That is, when the subject is an object (roadside boundary 140) that is situated continuously in first region 110 and second region 120, the computation result of first region 110 is associated with computation of subject information in second region 120.

Alternatively, when the subject is an object (roadside boundary 140) that is situated continuously in first region 110 and second region 120, the computation result of first a region 110a is associated with computation of subject information in a region (second region 120, first b region 110b) other than first a region 110a.

Also, imaging apparatus 1 may be configured to, for example, perform imaging using first pixels 21 and imaging using second pixels 22 at different timings at a predetermined frame rate, and perform output of imaging signals from first pixels 21 (hereinafter also referred to as "IR imaging signals") and output of imaging signals from second pixels 22 (hereinafter also referred to as "W imaging signals") at different timings at the predetermined frame rate.

FIG. 11 is a schematic diagram showing an example of the relationship between the output order of IR imaging signals and the output order of W imaging signals when imaging apparatus 1 has the above-described configuration.

Furthermore, imaging apparatus 1 may be configured to, for example, interpolate IR imaging signals with W imaging signals.

Figure 12A:
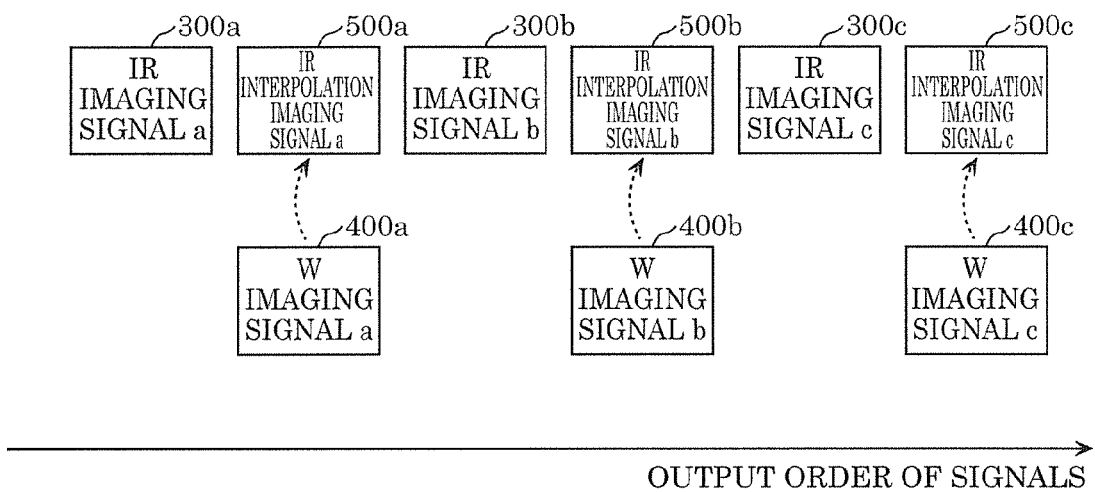
FIG. 12A is a schematic diagram showing an example of the relationship between the output order of IR images and the output order of IR interpolation images.

FIG. 12A is a schematic diagram showing an example of the relationship between the output order of IR imaging signals and the output order of imaging signals (hereinafter also referred to as "IR interpolation imaging signals") obtained by interpolating IR imaging signals with W imaging signals when imaging apparatus 1 has the above-described configuration.

In FIG. 12A, IR interpolation imaging signal a 500a is an IR interpolation imaging signal that is generated based on W imaging signal a 400a and used to interpolate between IR imaging signal a 300a and IR imaging signal b 300b. IR interpolation imaging signal b 500b is an IR interpolation imaging signal that is generated based on W imaging signal b 400b and used to interpolate between IR imaging signal b 300b and IR imaging signal c 300c. IR interpolation imaging signal c 500c is an IR interpolation imaging signal that is generated based on W imaging signal c 400c and used to interpolate between IR imaging signal c 300c and IR imaging signal d (not shown).

As shown in FIG. 12A, imaging apparatus 1 having the above-described configuration can substantially increase the output frame rate of IR imaging signals. As a result, imaging apparatus 1 having the above-described configuration can further improve the accuracy of measuring the distance to the subject and/or the accuracy of detecting the subject.

Also, imaging apparatus 1 may be configured to, for example, generate an IR interpolation imaging signal (for example, IR interpolation imaging signal a 500a) based on, in addition to a W imaging signal (for example, W imaging signal a 400a) corresponding to the IR interpolation imaging signal, the previous and subsequent IR imaging signals (for example, IR imaging signal a 300a and IR imaging signal b 300b). With this configuration, imaging apparatus 1 having the above-described configuration can generate an IR interpolation imaging signal with a higher degree of accuracy.

Furthermore, imaging apparatus 1 may be configured to, for example, interpolate W imaging signals with IR imaging signals.

Figure 12B:
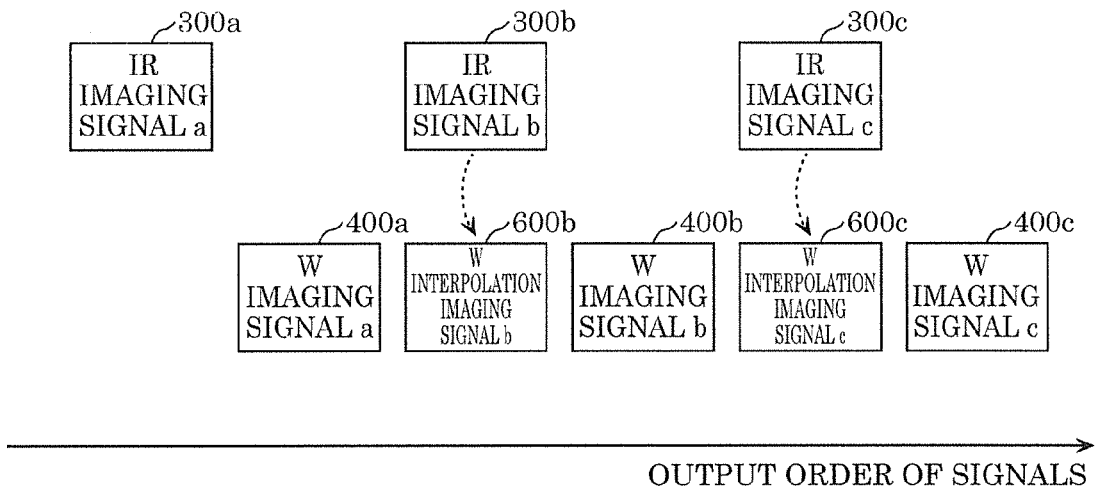
FIG. 12B is a schematic diagram showing an example of the relationship between the output order of W images and the output order of W interpolation images.

FIG. 12B is a schematic diagram showing an example of the relationship between the output order of W imaging signals and the output order of imaging signals (also referred to as "W interpolation imaging signals") obtained by interpolating W imaging signals with IR imaging signals when imaging apparatus 1 has the above-described configuration.

As shown in FIG. 12B, W interpolation imaging signal b 600b is a W interpolation imaging signal that is generated based on IR imaging signal b 300b and used to interpolate between W imaging signal a 400a and W imaging signal b 400b. W interpolation imaging signal c 600c is a W interpolation imaging signal that is generated based on IR imaging signal c 300c and used to interpolate between W imaging signal c 400b and W imaging signal c 400c.

As shown in FIG. 12B, imaging apparatus 1 having the above-described configuration can substantially increase the output frame rate of W imaging signals. As a result, imaging apparatus 1 having the above-described configuration can further improve the accuracy of measuring the distance to the subject and/or the accuracy of detecting the subject.

Also, imaging apparatus 1 may be configured to, for example, generate a W interpolation imaging signal (for example, W interpolation imaging signal b 600b) based on, in addition to an IR imaging signal (for example, IR imaging signal b 300b) corresponding to the W interpolation imaging signal, the previous and subsequent W imaging signals (for example, W imaging signal a 400a and W imaging signal b 400b). With this configuration, imaging apparatus 1 having the above-described configuration can generate a W interpolation imaging signal with a higher degree of accuracy.

Other Embodiments

The embodiment given above has been described as an example of a technique disclosed in the present application. However, the technique according to the present disclosure is not limited thereto, and is also applicable to embodiments obtained by making modifications, replacements, additions, omissions and the like as appropriate.

(1) In the present disclosure, an example has been described in which computator 30 and controller 40 are implemented by computation processing devices such as microprocessors. However, computator 30 and controller 40 are not limited to the implementation example given above as long as they have the same functions as those of the implementation example. For example, computator 30 and controller 40 may be configured such that some or all of the structural elements of computator 30 and controller 40 are implemented by a dedicated circuit.

(2) The structural elements of imaging apparatus 1 may be configured as individual single chips by using semiconductor devices such as ICs (Integrated Circuits) or LSIs (Large Scale Integrations), or some or all of them may be configured in a single chip. Also, implementation of an integrated circuit is not necessarily limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI. Furthermore, if a technique for implementing an integrated circuit that can replace LSIs appears by another technique resulting from the progress or derivation of semiconductor technology, the functional blocks may be integrated by using that technique. Application of biotechnology or the like is possible.

(3) Embodiments implemented by any combination of the structural elements and the functions described in the embodiment given above are also encompassed in the scope of the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is widely applicable to an imaging apparatus that images a subject.

What is claimed is:

1. An imaging apparatus that is mounted on a vehicle that runs on a road surface, the imaging apparatus comprising:
a light source that emits illumination light which is infrared light;
a solid-state imaging device that images a subject and outputs an imaging signal indicating a light exposure amount; and
a computator that computes subject information regarding the subject by using the imaging signal,
wherein the solid-state imaging device includes: first pixels that image the subject by receiving reflected light that is the illumination light reflected off the subject; and second pixels that image the subject by receiving visible light,
the first pixels output an imaging signal corresponding to information regarding a slope of the road surface,
the second pixels output an imaging signal corresponding to information regarding an appearance of the road surface,
an imaging region to be imaged by the solid-state imaging device is an area located in front of the imaging apparatus, and includes a first region that is imaged by at least the first pixels and a second region that is imaged by the second pixels,
one of the first region and the second region is situated around the other of the first region and the second region,
the computator computes the subject information based on information from the first region and information from the second region,
a computation performed by the computator computing the subject information includes a computation for estimating the slope of the road surface of a region imaged by the second pixel, based on the information regarding the slope of the road surface and the information regarding the appearance of the road surface, and
the subject information includes information indicating the slope of the road surface of the region imaged by the second pixel which is estimated by the computation.

2. The imaging apparatus according to claim 1, wherein the information regarding the appearance of the road surface is information regarding a roadside boundary.

3. The imaging apparatus according to claim 1, wherein the first pixels and the second pixels are placed in alternate rows to form a stripe pattern.

4. The imaging apparatus according to claim 1, wherein the imaging apparatus performs one of forward monitoring and backward monitoring.

5. The imaging apparatus according to claim 1,
wherein the imaging apparatus performs one of diagonal monitoring and lateral monitoring, and
an illumination angle of the illumination light in a horizontal direction of the vehicle and a viewing angle of an imaging region in the horizontal direction of the vehicle are substantially equal.

6. The imaging apparatus according to claim 1,
wherein the subject is an object on a road surface,
the solid-state imaging device successively performs imaging, and
when the object is imaged in the first region at a first time, and then imaged in the second region at a second time that is time when a predetermined period of time has elapsed from the first time, information regarding a distance to the object at the first time is used to compute the subject information at the second time.

7. The imaging apparatus according to claim 1,
wherein the subject is an object on a road surface,
the solid-state imaging device successively performs imaging, and
when the object is imaged in the second region at a first time, and then imaged in the first region at a second time that is time when a predetermined period of time has elapsed from the first time, information regarding an appearance of the object at the first time is used to compute the subject information at the second time.

8. The imaging apparatus according to claim 1,
wherein the solid-state imaging device successively performs imaging, and
the computation performed by the computator includes associating information from one of the first region and the second region at a first time with information from the other of the first region and the second region at a second time that is different from the first time.

9. The imaging apparatus according to claim 1, wherein, when the subject is an object that is continuously situated in the first region and the second region, a computation result of the first region is associated with computation of the subject information in the second region.

10. The imaging apparatus according to claim 1, wherein the first region includes a first a region where reflected light that is the illumination light reflected off a road surface reaches the solid-state imaging device and a first b region where the reflected light does not reach the solid-state imaging device.

11. The imaging apparatus according to claim 10, wherein, when the subject is an object that is continuously situated in the first region and the second region, a computation result of the first a region is associated with computation of the subject information in a region other than the first a region.

12. A solid-state imaging device used in an imaging apparatus that is mounted on a vehicle that runs on a road surface and includes a light source that emits illumination light which is infrared light, the solid-state imaging device, and a computator that computes subject information regarding a subject by using an imaging signal, the solid-state imaging device comprising:
   first pixels that image the subject by receiving reflected light that is the illumination light reflected off the subject; and
   second pixels that image the subject by receiving visible light,
   wherein the first pixels output an imaging signal corresponding to information regarding a slope of the road surface,
   the second pixels output an imaging signal corresponding to information regarding an appearance of the road surface,
   an imaging region to be imaged by the solid-state imaging device is an area located in front of the imaging apparatus, and includes a first region that is imaged by at least the first pixels and a second region that is imaged by the second pixels,
   one of the first region and the second region is situated around the other of the first region and the second region,
   the computator computes the subject information based on information from the first region and information from the second region,
   a computation performed by the computator computing the subject information includes a computation for estimating the slope of the road surface of a region imaged by the second pixel, based on the information regarding the slope of the road surface and the information regarding the appearance of the road surface, and
   the subject information includes information indicating the slope of the road surface of the region imaged by the second pixel which is estimated by the computation.

* * * * *